United States Patent Office  3,270,089
Patented August 30, 1966

3,270,089
FLAME-RETARDANT COMPOUNDS AS CROSS-LINKING MONOMERS
James C. Wygant, Creve Coeur, and Richard M. Anderson, St. Louis, Mo., assignors to Monsanto Company, a corporation of Delaware
No Drawing. Filed June 11, 1963, Ser. No. 286,939
19 Claims. (Cl. 260—869)

The present invention relates to processes for using (1,2,3,4,7,7 - hexahalobicyclo-[2.2.1]-2-heptenyl-5) vinyl ethers as cross-linking monomers for preparing flame-retardant polyester resins and to the cured polyesters prepared therefrom.

It is an object of this invention to provide methods whereby the (1,2,3,4,7,7 - hexahalobicyclo-[2.2.1]-2-heptenyl-5) vinyl ethers can be chemically combined with unsaturated polyesters to give flame-retardant products. Another object is to provide methods whereby the (1,2,3,4,7,7-hexahalobicyclo-[2.2.1]-2-heptenyl-5) vinyl ethers are used as cross-linking monomers for curing unsaturated polyesters. Another object is to provide flame-retardant polyester resins containing the aforementioned halogen-containing compounds as reacted monomer. Still other objects and advantages will be evident to persons skilled in the art from the following detailed description of the invention.

The (1,2,3,4,7,7-hexahalobicyclo-[2.2.1]-2-heptenyl-5) vinyl ethers have the structural formula:

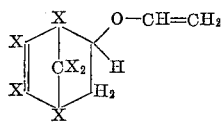

where X is an halogen atom. For convenience compounds having this formula will subsequently be referred to as "HHVE compounds."

By "halo" or "halogen" is meant the non-metallic elements of the seventh group of the periodic system and especially chlorine and bromine. Thus all the X's may be chlorine; all may be bromine; several X's may be chlorine and the remainder, bromine; etc.

Preferred compounds included within this invention are: the hexachloro derivative, i.e., (1,2,3,4,7,7-hexachlorobicyclo-[2.2.1]-2-heptenyl-5) vinyl ether; the hexabromo derivative, i.e., (1,2,3,4,7,7-hexabromobicyclo-[2.2.1]-2-heptenyl-5) vinyl ether; and the hexahalo derivatives containing both chlorine and bromine atoms, i.e., the monobromopentachlorides, the dibromotetrachlorides, the tribromotrichlorides, the tetrabromodichlorides, and the pentabromomonochlorides.

These compounds may be prepared by repeated procedures from divinyl ether and the appropriate hexahalocyclopentadiene.

For example (1,2,3,4,7,7-hexachlorobicyclo-[2.2.1]-2-heptenyl-5) vinyl ether is obtained in a 1-step process by adding a stoichiometric amount of divinyl ether to hexachlorocyclopentadiene in a hydrocarbon or halocarbon solvent (e.g., benzene, toluene, xylene, orthene, etc.) The reaction is carried out at temperatures between about 70°–150° centigrade for periods ranging from 6 to 36 hours or more.

Another procedure presently devised is preferred in that no by-products are formed. This consists of 3 steps. The hexahalocyclopentadiene (1 mole) is gradually added to excess divinyl ether (2 to 5 moles) over 1–2 hours at 0°–10° centigrade. Then reaction is carried out at 25°–40° centigrade for 6–36 hours. The product may be recovered at this stage. However better yields are obtained by adding a high-boiling hydrocarbon or halocarbon solvent (see supra for examples) and subsequently heating at 70°–150° centigrade for several hours to several days depending on the size of the run, the temperature, the extent of reaction desired, etc.

Either procedure discussed above may be used to prepare the (1,2,3,4,7,7-hexabromo-[2.2.1]-2-heptenyl-5) vinyl ether by employing hexabromocyclopentadiene as the starting material.

Adducts containing both chlorine and bromine are readily prepared from the corresponding hexahalo substituted cyclopentadiene. Thus the hexachlorocyclopentadiene may be partially brominated and the resulting product reacted with divinyl ether following the above procedures to give hexahalo adducts containing both chlorine and bromine atoms.

The unsaturated polyesters used in this invention are poly condensation reaction products prepared from polybasic carboxylic compounds and polyhydric alcohols, wherein either the polybasic compound or the polyhydric alcohol, or both, have carbon-to-carbon unsaturation (i.e., doubly bonded carbon atoms). But since unsaturated polyhydric alcohols are not readily available on a commercial basis the unsaturated polyesters herein employed will generally have their unsaturated groups in the polybasic component of the polyester chain.

Most unsaturated polyesters are made up of at least 2 polybasic compounds—one unsaturated and the other saturated or aromatic. But where a high degree of cross-linking is desired the unsaturated compound may be the only polybasic component. In the mixed acid composition, the lower the ratio of the unsaturated compound, the less closely linked and more flexible the copolymer obtained in the cross-linking reaction. In the usual case the unsaturated polyester will contain from 5 to 60 mole percent of the saturated and/or aromatic component in its polybasic phase.

It is understood that the term "polybasic compound" is not limited to polybasic acids but also includes other polybasic compounds which will react with polyhydric alcohols to give polyesters. For example polybasic carboxylic anhydrides will usually be used in actual practice.

The unsaturated polybasic compounds used to prepare the unsaturated polyesters are characterized by having aliphatic carbon-to-carbon unsaturation. Examples include fumaric acid, maleic acid, itaconic acid, citraconic acid, tetrahydrophthalic acid, mesaconic acid, glutaconic acid, alpha-hydromuconic acid, beta-hydromuconic acid, etc.

The most commonly used non-unsaturated polybasic compound is phthalic acid. Other saturated or aromatic acids frequently used as monomers include isophthalic acid, terephthalic acid, hexahydrophthalic acid, endomethylene hexahydrophthalic acid, adipic acid, pimelic acid, azelaic acid, etc. As a rule the polybasic compounds utilized in this invention, whether unsaturated, saturated or aromatic will have 12 or fewer carbon atoms.

The principal polyhydric alcohols used in polyester synthesis are the glycols (i.e., compounds with 2 hydroxyl groups).

Probably most often used of the saturated dihydric alcohols are ethylene glycol, propylene glycol (which is especially preferred), butylene glycol, diethylene glycol, dipropylene glycol, etc. Polyesters based on the bisphenol glycol system yield resins which are preferred for some purposes. The prime example of an unsaturated polyhydric alcohol is butene-diol. As a rule the polyhydric alcohols presently employed will have about 12 or fewer carbon atoms.

The proportion of polyhydric alcohol is approximately controlled by the total equivalents of polybasic monomers (acids and/or anhydrides) employed in the charge. Preferably equivalent amounts are used, however, either the acids or alcohols may be in substantial excess. Usually no more than 20 percent molar excess monomer is used.

Esterification reaction catalysts such as sulfonic acids (e.g., p-toluene sulfonic acid) or amines (e.g., pyridine, triethylamine, quinoline, etc.) may be added to the monomer mixture where more rapid reactions are desired.

Chain-stoppers are sometimes added in minor proportions to rapidly terminate the growth of the polyester chain by introducing hydrocarbon terminal residues. Among the compounds suitable for use as chain-stoppers are monohydric alcohols (e.g., butyl, hexyl, octyl, dodecyl, benzyl, or tetrahydrofurfuryl alcohol) and monobasic acids (e.g., acetic, propionic, butyric, valeric, or benzoic acid).

The temperature for carrying out the reaction between the polyhydric alcohols and the polybasic compounds ranges from 100° to 200° centigrade, although higher and lower temperatures can be used. Preferably 150°- to 200° centigrade is employed.

An inert gas such as nitrogen is passed through the mixture in the preferred procedure to eliminate side reactions. The progress of the reaction is followed by measuring the amount of water liberated, by determining the viscosity of the resin, from its acid number, or by using other commonly known methods. The extent to which the reaction is carried will depend on a number of factors such as desired viscosity, acid number, etc.

The process of curing the unsaturated polyesters described above involves copolymerization with a HHVE compound which can be employed as the sole cross-linking monomer or as one of several cross-linking monomers used to effect the cure.

Where several cross-linking agents are used it is desirable to have the HHVE compound present in at least 50 weight percent and, preferably, in 75 weight percent or more based on the total weight of the cross-linking monomers. Suitable "additional cross-linking agents" include styrene, vinyl toluene, diallyl phthalate, methyl methacrylate, triallyl cyanurate, and the like.

The proportion of cross-linking agent to unsaturated polyester may be varied between the ultimate limits without departing from the scope of this invention. For example, only a small proportion of cross-linking agent is needed when the proportions of cross-linkable bonds in the unsaturated polyester is very small or when it is desired to react only a part of the total unsaturated polyester with the cross-linking agent. On the other hand, a major proportion of cross-linking agent may be employed when the proportion of cross-linkable bonds in the unsaturated polyester is high or when maximum utilization of double bonds is desired. In general the concentration of the cross-linking agent in the unsaturated polyester varies from about 20 to about 75 percent by weight, based on the total cross-linkable composition (i.e., the unsaturated polyester and the cross-linking agents). In certain formulations it is preferable to employ between about 35 and about 60 percent of cross-linking agent by weight, based on the total charge.

A preferred procedure for combining the unsaturated polyester and cross-linking agent is to dissolve the unsaturated polyester in the cross-linking agent or a portion thereof while the polyester is still hot, thereby facilitating rapid solution. Conveniently styrene or another non-flame-retardant monomer is used to prepare this "base solution." The HHVE compound can be blended in any time prior to the curing operation.

Polymerization inhibitors, usually of the order of 0.001 to one percent by weight, based on the total cross-linkable composition, may be added to prevent premature polymerization (curing). Among the inhibitors which may advantageously be employed are substances such as hydroquinone, benzoquinone, p-(t-butyl)catechol, p-phenylene diamine, trinitrobenezene, picric acid, etc.

Polymerization catalysts are preferably added to the mixture of unsaturated polyester and cross-linking agent to effect the setting or curing. Usually employed are free-radical-forming catalysts such as molecular oxygen; peroxides (e.g., acetyl, benzoyl, or dicumyl peroxide); hydroperoxides (e.g., cumene hydroperoxide); peresters (e.g., potassium persulfates or t-butyl peracetate); and azo compounds (e.g., 2,2′ - bisazobutyronitrile). Such catalysts are used in a proportion of 0.01 to 10 weight percent, based on the total cross-linkable composition, depending on the efficiency of their action and whether or not substances which inhibit polymerization are present in the mixture to be cross-linked.

Additionally activators or accelerators (e.g., cobalt naphthenate, alkyl mercaptans, dialkyl aromatic amines, etc.) are often used to promote the cross-linking reaction so that cure can be effected at lower temperatures or shorter reaction times. These are used in proportion similar to those stated for the catalysts.

The polymerization conditions for effecting the cross-linking reaction may be selected from a wide variety of techniques and commonly involve the application of heat. The temperature depends on a variety of factors, particularly the boiling point of the cross-linking agent, catalyst activation temperature, and the exothermic characteristics of the polymerization mixture (i.e., a temperature should be selected which will give a suitable reaction rate and yet not cause substantial volatilization). Generally however curing will involve temperatures in the range of 60°–180° centigrade.

The cured polyesters of the present invention have particular utility wherever flame-retardant materials are desirable and, are advantageously employed in numerous applications, such as those summarized below:

| General Classification | Decription of Process | Specific Application |
|---|---|---|
| Binders | Resin used as adhesive to cement particles of materials together. Cured system will generally have more of the characteristics of the bonded material than of the resin. | Sand or aggregate filled for facing building block; binder for non-woven fibers such as glass, asbestos; etc. |
| Castings | Clear, pigmented, or filled resin cured in a mold to give a solid mass of the cured resin mixture. | Glazing for aircraft, embedments for decoration, jewelry, buttons, etc. |
| Cements, sealing and patching compounds. | Resins filled with any of a variety of materials to give putty-like consistency. Generally, pre-accelerated for room temperature cure. | Seal for ceramic drain pipe, automobile body solder, etc. |
| Coatings | Clear, pigmented, or filled formulation intended for application as a coating to metal, wood, masonry, etc. | Masonry, wood, metal, etc. |
| Potting | Varying degrees of impregnating, embedding or encapsulating of various assemblies for protection, strengthening, or holding in fixed position. | Electrical coils, terminal block, cable terminals, etc. |
| Tooling | Clear or highly filled cast resin for molds, templates or jigs, often reinforced with fibers. | Tooling fixtures, prototype parts, plastics forming dies and molds, etc. |
| Reinforced Plastics | Resin reinforced with glass fibers, metal mesh, cloth, etc., prior to molding. | Trays, furniture, fishing rods, continuous laminates, translucent panels, boats, radomes, etc. |

EXAMPLE 1

*(1,2,3,4,7,7-hexachlorobicyclo-[2.2.1]-2-heptenyl-5) vinyl ether*

To 187 g. (2.67 moles) of divinyl ether in a reaction flask fitted with a double wall reflux condenser is gradually added 273 g. (1 mole) of hexachlorocyclopentadiene over a period of ca. 1 hr. at 0°–10° C. The temperature is raised to 30°–35° C., and reaction is carried out for 25–30 hrs. O-dichlorobenzene, 1000 ml., is added as solvent and the heating continued for ca. 50 hrs. Distillation through a still-head (no column) gives the crude adduct, B.P. ca. 106° C./0.4–1.0 mm. Redistillation yields the pure adduct B.P. 92° C.–95° C./0.25 mm. *Analysis.*—Calcd. for $C_9H_6Cl_6O$: C, 31.5; H, 1.75; Cl, 62.0. Found: C, 31.6; H, 1.80; Cl, 61.8.

EXAMPLE 2

*Flame retardant polyester resins*

A flask is provided with a distillation trap, an addition funnel, an electric stirrer, and a thermometer. A solution of 83.5 g. of propylene glycol (1.1 moles) in 50 ml. of xylene is added and the system flushed with nitrogen. The flask is heated until the xylene is refluxing [1] and a mixture of 49.0 g. of maleic anhydride (0.5 mole) and 74.0 g. of phthalic anhydride is added, starting the reaction. The pot temperature is maintained between 150° and 200° C., until polymerization is complete. The reaction is followed by measuring water collected in the distillation trap and periodically determining the acid number [2] of the reaction mixture. After 140 min. the acid number has dropped to about 45.0, xylene is removed from the distillation trap and the reaction is stopped. The system is evacuated under reduced pressure to remove residual liquids and allowed to cool to about 75° C.

To 80 g. of the above unsaturated polyester is introduced 20.0 g. of styrene and 0.01 g. of hydroquinone. The ingredients are blended thoroughly to give a base solution containing 20% styrene by weight.

Unsaturated polyester containing 38.5% total cross-linking agent by weight based on the total cross-linkable composition is prepared by adding 6.0 g. of (1,2,3,4,7,7-hexachlorobicyclo-[2.2.1]-2-heptenyl-5) vinyl ether to 20.0 g. of base solution.

Unsaturated polyester containing 42.8% total cross-linking agent by weight based on the total cross-linkable composition is obtained by mixing 8.0 g. of the hexachloro adduct and 20.0 g. of the base solution.

Unsaturated polyester containing 46.6% total cross-linking agent by weight based on the total cross-linkable composition is obtained from 10.0 g. of the hexachloro adduct and 20.0 g. of base solution.

Unsaturated polyester containing 50% total cross-linking agent by weight based on the total cross-linkable composition is obtained from 12.0 g. of the hexachloro adduct and 20.0 g. of base solution.

Unsaturated polyester containing 55.6% total cross-linking agent by weight based on the total cross-linkable composition is obtained from 16.0 g. of the hexachloro adduct and 20.0 g. of base solution.

The unsaturated polyester/styrene/hexachloro adduct compositions are each agitated with 1.1 g. of 50% benzoyl peroxide and the resulting mixtures are poured into glass tubes.[3] Casts are made by heating the tubes at 110° C., for 15 hrs.

The cured polyester resins are hard, tough, insoluble, infusible, and immediately self-extinguishing on removal from an oxidizing flame.

What is claimed is:
1. A process for cross-linking polyesters which comprises curing a poly condensation unsaturated polyester of a polybasic compound and a polyhydric alcohol, with at least one of said polybasic compound and polyhydric alcohol having carbon-to-carbon unsaturation with a (1,2,3,4,7,7 - hexahalobicyclo-[2.2.1]-2-heptenyl-5) vinyl ether.

2. A process for cross-linking polyesters which com-

[1] Xylene forms an azeotrope with water formed during the polymerization; this is collected in the distillation trap and removed. The mixture refluxes at about 145° C.
[2] The acid number represents the amount of free acid present in a substance; it is expressed by the number of mg. of potassium hydroxide which are required to neutralize the acid in a g. of substance.
[3] The glass tubes are sealed at one end, have an inside diameter of 19/64", and are 6¾" long. They are filled to 6½" with the polyester mixture.

prises polymerizing (1) a poly condensation unsaturated polyester of a polybasic compound and a polyhydric alcohol, with at least one of said polybasic compound and polyhydric alcohol having carbon-to-carbon unsaturation and (2) a sufficient amount of a (1,2,3,4,7,7-hexahalobicyclo-[2.2.1]-2-heptenyl-5) vinyl ether to render the polyester resin flame-retardant.

3. The process of claim 2 where the unsaturated polyester is a condensation polymer of (1) a polybasic carboxylic compound containing aliphatic carbon-to-carbon unsaturation, (2) a compound selected from the group consisting of saturated polybasic carboxylic compounds and aromatic polybasic carboxylic compounds, and (3) a polyhydric alcohol.

4. A process for cross-linking polyesters which comprises polymerizing (1) an unsaturated polyester of (a) a polybasic compound containing aliphatic carbon-to-carbon unsaturation, (b) a compound selected from the group consisting of saturated polybasic carboxylic compounds and aromatic polybasic carboxylic compounds, and (c) a polyhydric alcohol; (2) an unsaturated cross-linking monomer; and (3) a sufficient amount of a (1,2,3,4,7,7-hexahalobicyclo-[2.2.1]-2-heptenyl - 5) vinyl ether to render the polyester resin flame-retardant.

5. The process of claim 4 where the polybasic compound with aliphatic carbon-to-carbon unsaturation is maleic acid.

6. The process of claim 4 where the compound selected from the group consisting of saturated polybasic carboxylic compounds and aromatic polybasic carboxylic compounds is phthalic acid.

7. The process of claim 4 where the polyhydric alcohol is a saturated glycol.

8. The process of claim 4 where the unsaturated cross-linking monomer is selected from the group consisting of styrene, vinyl toluene, diallyl phthalate, methyl methacrylate, and triallyl cyanurate.

9. The process of claim 4 where the halogens in the vinyl ether are chlorine.

10. A process for cross-linking polyesters which comprises polymerizing (1) an unsaturated polyester of (a) maleic acid, (b) phthalic acid, and (c) propylene glycol; (2) styrene; and (3) (1,2,3,4,7,7-hexachlorobicyclo-[2.2.1]-2-heptenyl-5) vinyl ether where the combined amount of styrene and hexachloro vinyl ether compound varies from about 20 to about 75 percent based on the weight of the total cross-linkable composition and the hexachloro vinyl ether compound is used in an amount at least equal to the weight of styrene employed.

11. A cured polyester which comprises the reaction product of a poly condensation unsaturated polyester of a polybasic compound and a polyhydric alcohol, with at least one of said polybasic compound and polyhydric alcohol having carbon-to-carbon unsaturation and a (1,2,3,4,7,7-hexahalobicyclo-[2.2.1]-2-heptenyl - 5) vinyl ether.

12. A cured polyester which comprises the reaction product of (1) a poly condensation unsaturated polyester of a polybasic compound and a polyhydric alcohol, with at least one of said polybasic compound and polyhydric alcohol having carbon-to-carbon unsaturation, (2) an unsaturated cross-linking monomer, and (3) a (1,2,3,4,7,7-hexahalobicyclo-[2.2.1]-2-heptenyl-5) vinyl ether.

13. The polyester of claim 12 where the unsaturated polyester is a polymer of (1) a polybasic carboxylic compound containing aliphatic carbon-to-carbon unsaturation, (2) a compound selected from the group consisting of saturated polybasic carboxylic compounds and aromatic polybasic carboxylic compounds, and (3) a polyhydric alcohol.

14. The polyester of claim 12 where the unsaturated cross-linking monomer is selected from the group consisting of styrene, vinyl toluene, diallyl phthalate, methyl methacrylate, and triallyl cyanurate.

15. The polyester of claim 12 where the halogens in the vinyl ether are chlorine.

16. The polyester of claim 12 where the combined amount of unsaturated cross-linking monomer and hexahalo vinyl ether compound varies from about 20 to about 75 percent based on the weight of the total cross-linkable composition.

17. The polyester of claim 12 where hexahalo vinyl ether compound is used in an amount at least equal to the weight of unsaturated cross-linking monomer employed.

18. A cured polyester which comprises the reaction product of (1) a polycondensation unsaturated polyester of (a) polybasic compound containing aliphatic carbon-to-carbon unsaturation, (b) a compound selected from the group consisting of saturated polybasic carboxylic compounds and aromatic polybasic carboxylic compounds, and (b) a saturated polyhydric alcohol; (2) an unsaturated cross-linking monomer selected from the group consisting of styrene, vinyl toluene, diallyl phthalate, methyl methacrylate, and triallyl cyanurate; and (3) a (1,2,3,4,7,7-hexahalobicyclo-[2.2.1]-2-heptenyl-5) vinyl ether where the combined amount of unsaturated cross-linking monomer and hexahalo vinyl ether compound varies from about 20 to about 75 percent based on the weight of the total cross-linkable composition and the hexahalo vinyl ether compound is used in an amount at least equal to the weight of styrene employed.

19. A cured polyester which comprises the reaction product of (1) a polycondensation unsaturated polyester of (a) maleic acid, (b) phthalic acid, and (c) propylene glycol; (2) styrene; and (3) (1,2,3,4,7,7-hexachlorobicyclo-[2.2.1]-2-heptenyl-5) vinyl ether where the combined amount of styrene and hexacholor vinyl ether compound varies from about 20 to about 75 percent based on the weight of the total cross-linkable composition and the hexachloro vinyl ether compound is used in an amount at least equal to the weight of styrene employed.

References Cited by the Examiner
UNITED STATES PATENTS

| | | | |
|---|---|---|---|
| 2,795,619 | 6/1957 | Goldman | 260—85.7 |
| 3,110,694 | 11/1963 | Willerson et al. | 260—869 |

SAMUEL H. BLECH, *Primary Examiner.*

MURRAY TILLMAN, *Examiner.*

JOHN T. GOOLKASIAN, *Assistant Examiner.*